United States Patent [19]

Eichinger, deceased et al.

[11] 3,977,240

[45] Aug. 31, 1976

[54] ENGINE TEST SYSTEM

[76] Inventors: Daniel B. Eichinger, deceased, late of Philadelphia, Pa.; Regina M. Eichinger, widow, 8508 Harley Ave., Philadelphia, Pa. 19153

[22] Filed: Feb. 1, 1971

[21] Appl. No.: 111,484

[52] U.S. Cl. .................................. 73/116
[51] Int. Cl.² ......................... G01M 15/00
[58] Field of Search ........... 73/116, 134; 123/179 F

[56] References Cited
UNITED STATES PATENTS

| | | | |
|---|---|---|---|
| 1,065,025 | 6/1913 | Botts | 123/179 F |
| 1,743,409 | 1/1930 | Tracy | 188/292 |
| 2,603,968 | 7/1952 | Cline | 73/134 |
| 2,623,393 | 12/1952 | Morrison | 74/6 |
| 2,710,606 | 6/1955 | Jenny | 74/6 X |
| 2,993,369 | 7/1961 | Bonomo et al. | 73/134 |
| 3,051,136 | 8/1962 | Muehlhausen | 123/179 F |
| 3,138,018 | 6/1964 | Pohl | 73/134 |
| 3,413,860 | 12/1968 | Heckt | 74/6 |
| 3,616,785 | 11/1971 | Smith et al. | 123/179 F |

*Primary Examiner*—Jerry W. Myracle
*Attorney, Agent, or Firm*—Nelson E. Kimmelman

[57] ABSTRACT

The output shaft of an engine to be tested is coupled to a pneumatically controlled engine-turnover system. The output shaft is also coupled to a hydraulic pump of the gear type having an output line which is valve-controlled to vary its output hydraulic pressure to provide an adjustable load. The operator, by referring to an appropriate chart, can adjust the load on the engine to any desired horsepower output by adjusting the pump output pressure and the rotary speed of the engine output shaft.

5 Claims, 5 Drawing Figures

INVENTOR.
DANIEL B. EICHINGER
BY

Maleson, Kimmelman + Ratner
ATTORNEY.

ENGINE TEST SYSTEM

BACKGROUND OF THE INVENTION

1. Field of the Invention

This invention relates to systems for testing the performance of engines and in particular, the performance of engines of the internal combustion type.

2. Prior Art

Previously, in checking the performance of engines, whether newly manufactured or re-manufactured, available test equipment of the water-pump type could not be adjusted to operate the engine at any desired horsepower level since the operating data supplied with the apparatus included an operating chart which was not very accurate unless a certain minimal engine speed was attained. This was due, in part, to the fact that these prior art systems included a water pump which, like a sump pump did not have constant displacement. The use of water pumps also gave rise to maintenance problems due to the fact that water is corrosive and would get past the seals when it started to wear and mix with the lubrication oil in the bearings.

Other types of prior art apparatus used for the same purpose involved the use of electrical generators hooked up to the engine output shaft. However, this type generated high voltage which had to be dissipated somehow, was a fire hazard, was costly and required an electrician in attendance.

The present invention is designed to overcome these problems by employing an oil pump which has constant displacement and therefore can work more effectively at lower engine speeds. The use of an oil pump also obviates many maintenance problems since it is self-lubricating and there are no problems due to faulty seals as there are with pumps designed for use with water. There is also very little fire hazard and maintenance is comparatively negligible.

BRIEF STATEMENT OF THE INVENTION

Apparatus for testing the performance of an engine, such as an internal combustion type, which has a rotary output shaft includes (a) means releasably securable to said shaft for turning over the engine and (b) means including a hydraulic gear pump with an adjustable valve to control the hydraulic pressure at its output.

BRIEF DESCRIPTION OF THE DRAWINGS

FIGS. 1a and 1b show details of the starter coupling of FIG. 1.

DETAILED DESCRIPTION OF THE DRAWINGS

Figure 1:
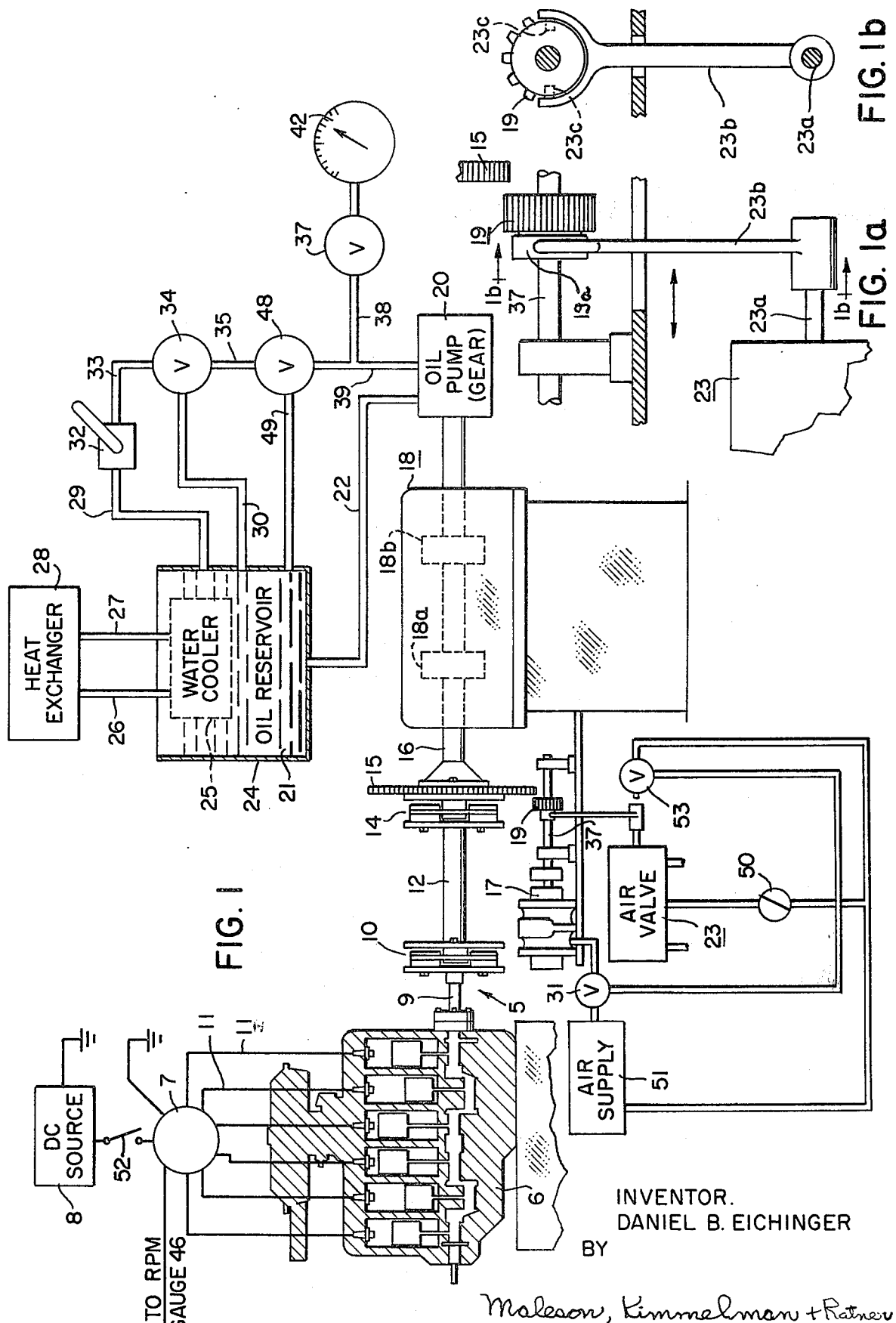
FIG. 1 is an overall composite representation of the over-all system which is partly schematic, partly side-elevational, and partly in section.

Referring to FIG. 1 there is shown indicated generally at the numeral 5 the over-all test system according to this invention. An engine 6 to be tested is positioned on an appropriate mount and its output shaft is coupled by a stub-shaft 9 to a coupling 10 which itself is coupled by an intermediate shaft 12 to another coupling 14 that is connected to the test system of the present invention. This arrangement is useful in off-setting effects of any misalignments between the output shaft of motor 6 and the flywheel 15 input to the novel test system. The couplings 10 and 14 may be "Morflex" couplings, Type 1002 sold by Transmission Engineering Co., Inc. of Fort Washington, Pa.

The flywheel 15 is connected to a shaft 16, supported by bearings 18a and 18b, which operates an oil pump 20 of the constant displacement type. One such pump is the "HYDRECO" gear pump sold by General Signal Corp. of Kalamazoo, Mich. Oil is constantly supplied to the pump 20 via conduit 22 from oil reservoir 24. The reservoir contains oil 21 that is cooled by a water cooler 25 connected via conduits 26 and 27 to any conventional heat exchanger 28.

The output of the oil pump 20 appears at the conduit 39 to which a valve 37 is coupled by a conduit 38. The valve 37 is also coupled to a hydraulic pressure meter 42 (also shown in FIG. 2). A valve 48 is also coupled to the output of pump 20 for controlling or regulating the pump output pressure. There is a return line 49 from the valve 48 to the reservoir 24. Two other valves, one a fast-release toggle type valve 32 and a knob-type relief valve 34 are in parallel with one another and both are in series with the valve 48. The relief valve 34 is coupled to the reservoir by conduit 30 and to the toggle valve 32 by conduit 33. Toggle valve 32 is connected to return line 29 which runs to the reservoir 34.

The engine 6 under test is associated with a distributor 7 which is connected to a DC source 8 via a switch 52. Distributor 7 is also connected via cables 11 to the spark plugs of the various cylinders. Distributor 7 is also coupled to the rpm gauge 46 (see FIG. 2) to give a continuous reading of the speed of the engine 6.

Figure 2:
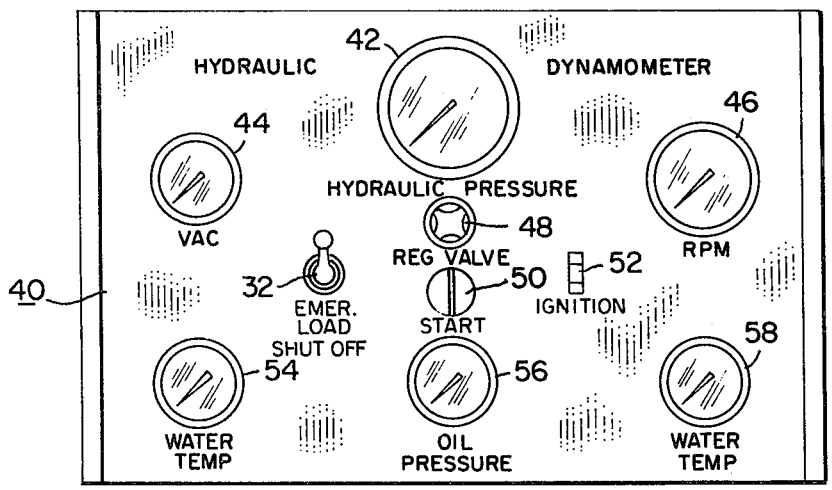
FIG. 2 shows the face of the control panel for the system in FIG. 1.

In order to turn the engine 6 over, the flywheel 15 is coupled to an air-propelled starting system consisting of air-motor 17 on whose output shaft 37 a clutch drive assembly 19 is mounted which may be a Model D-2000 assembly supplied by the Delco Remy Company. Air motor 17 may be one sold by the Gast Manufacturing Corp. of Benson Harbor, Michigan. The gear assembly 19 moves to the right on shaft 37 in response to air pressure supplied to it from air supply 51 via air cylinder 23 upon the actuation of the starting button 50 (FIG. 2). When button 50 is pressed, the forked member 23b having lateral projections 23c disposed within horizontal apertures in portion 19a moves on shaft 37 to the right thereby moving the assembly 19 into engagement with the flywheel gear 15. At the same time, when the forked member moves to the right it touches an actuating button on pilot valve 53 that supplies air from supply 51 to operate air valve 31. Valve 31 thereupon opens to permit compressed air from air supply 51 to be supplied to the air motor 17 causing it to revolve. As it does, the assembly 19, the flywheel 15 and the motor shaft also rotate causing the motor to turn over.

When it is desired to check the performance of an engine the following test procedure is used:

1. The engine 6 is coupled via the couplings 14 and 10 to the test apparatus.
2. The distributor 7 is connected to a DC source as shown.
3. Water and oil are put into the engine 6.
4. Ignition switch 52 is closed.
5. The starter button 50 is pressed which causes the forked member to move gear assembly 19 to the right thereby meshing with flywheel 15 and, simultaneously, pressing the operating button on valve 53 which thereupon actuates air valve 31. Consequently, the flywheel 15 starts to rotate and the engine 6 starts. As soon as the engine starts, the assembly 19 is retracted to the left out of mesh with flywheel 15.

6. The engine 6, its oil pressure (meter 56, FIG. 2) and other parameters are checked. The temperature of the water in the input to the engine is shown by meter 54; the output water temperature is shown by meter 58.

Figure 3:
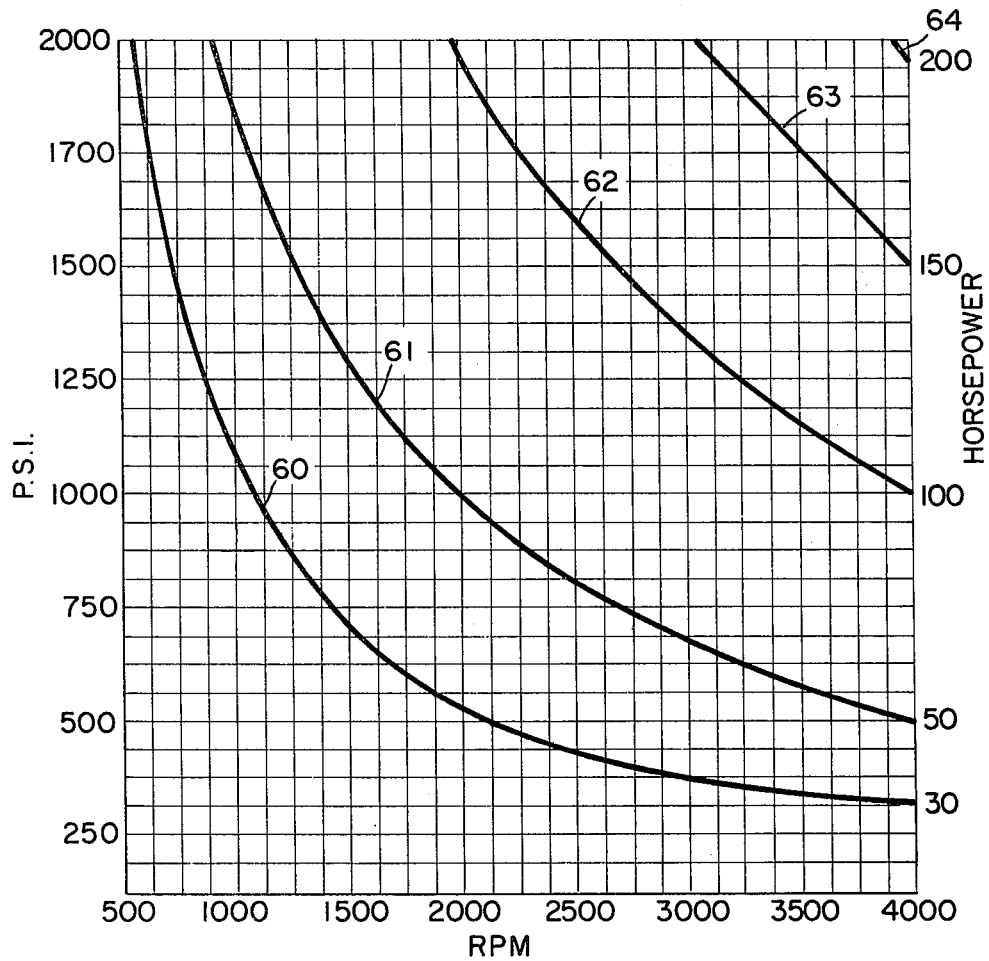
FIG. 3 is a graph of different horsepower curves plotted on a pressure-rpm diagram for use in setting parameters for the system shown in FIG. 1.

7. In order to break in the motor it is advisable to bring it up to the desired maximum speed in a number of graduated steps so that the bearings and other moving parts can work in or seat without scoring. The motor speed is increased by changing the set screw on the carburetor and the oil pressure in the test system is increased by manipulating valve 48 to the desired initial horsepower condition. For example, if it is desired to first check performance at 30 horsepower, the motor speed is increased to 1000 rpm. The operator then refers to the graph shown in FIG. 3 wherein the curve 60, 61, 62, 63 and 64 represent 30, 50, 100, 150 and 200 horsepower parameters respectively. The operator notes that a point on the 30 HP curve is located where the 1000 rpm and the 1062 PPS lines intersect. The operator therefore turns the valve 48 until the meter 42 indicates approximately 1062 pounds per square inch pressure. The operation of the engine at this setting is then observed for, say, ½ hour.

8. After the initial run at 30 horsepower, the engine is then tested, for example, at 50 horsepower. Accordingly, the operator changes the set screw on the carburetor so as to increase the motor speed to 1500 rpm and changes the oil pressure by adjustment of valve 48 until the meter 42 reads approximately 1300 psi. These two parameters fix a point on the 50 horsepower curve 61. Again, the performance of the engine at this higher horsepower is observed for the stated time such as ½ hour.

9. The process is then repeated at the next desired higher horsepower rating and the engine is observed for any abnormal noises. This may or may not be the last horsepower performance test depending upon the specifications for the motor under test.

10. After the final horsepower test has been performed, the test system is shut off either by flipping the toggle switch 32 or the main pressure regulating valve 48 and the motor is listened to while its oil pressure is checked out.

11. Then the test system is disconnected from the engine by disengaging coupling 9.

Modifications of the present invention, which do not depart from the essence thereof, will occur to one skilled in the art upon perusal of the description and drawings herein. Consequently, I desire the invention to be limited solely by the claims which follow.

I claim:

1. Apparatus for testing performance of a power producing device having a rotary shaft output comprising:

a. pneumatically-actuated means adapted to be releasably coupled to said shaft for starting said device, said means including a first gear coupled to said output shaft and a pneumatically-actuated second gear which moves into engagement with said first gear to start said device, and b. means including a stationary, constant displacement hydraulic gear pump coupled to said shaft and presenting an adjustable load for said device, said (b) means including at least one valve coupled to the output of said pump for adjusting the hydraulic pressure output thereof and also including stationary heat-exchange means for cooling the hydraulic fluid appearing at the output of said pump.

2. The apparatus according to claim 1 with the addition of (c) first indicating means coupled to said pump for indicating the hydraulic pressure generated thereby, (d) second indicating means adapted to be connected to said device under test for indicating the rate of rotation of said shaft, the relation between the indications provided by said first and second indicating means providing the operator of said apparatus with quantitative data for appraising the performance of said device under test, and further wherein said pneumatically-actuated (a) means couplable to said output shaft includes a pneumatic motor having a rotating shaft on which said second gear is fixed, said shaft being movable laterally to bring said second gear into or out of engagement with said first gear and further includes a laterally-displaceable means coupled to the rotating shaft of said pneumatic motor for moving said rotating shaft laterally so as to bring said gears into engagement with one another, said laterally-displaceable means being pneumatically-actuated, and further includes switch means coupled to said pneumatic motor and adapted to be actuated by contact with said laterally displaceable moving means thereby to start said pneumatic motor when said laterally-displaceable means has brought said gears into mesh with one another.

3. The apparatus according to claim 2 wherein said switching means comprises a pneumatic valve which is actuated by contact with said laterally displaceable means and enables air to be supplied to said pneumatic motor to turn the rotating shaft thereof.

4. The apparatus according to claim 2 wherein said laterally-displaceable means which is pneumatically-actuated comprises a generally vertical forked means mounted for lateral displacement which moves said shaft laterally on which said second gear is fixed.

5. The apparatus according to claim 2 with the addition of chart means comprising hydraulic pressure, horse-power, and rotary shaft revolution rate data allowing the operator of said apparatus to adjust said apparatus to produce a desired horse-power output of said device under test.

* * * * *